Figure 1:
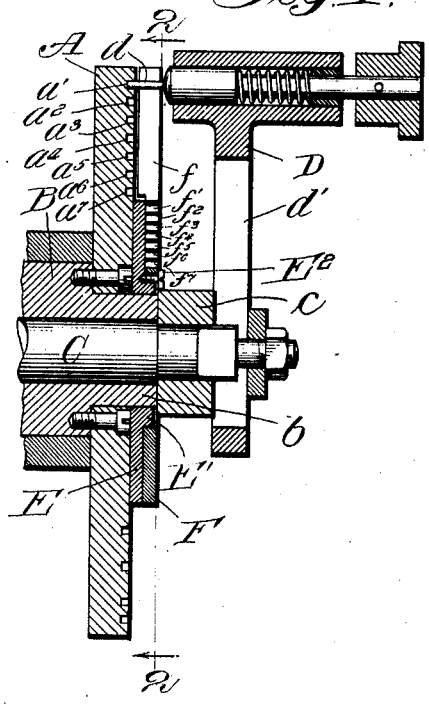

No. 893,954. PATENTED JULY 21, 1908.
I. VAN HUFFEL, Jr.
INDICATING SECTOR FOR DIVIDING HEADS.
APPLICATION FILED OCT. 28, 1907.

2 SHEETS—SHEET 1.

Witnesses:
Harry S. Gaither
Ruby V. Nash

Inventor:
Isadore Van Huffel Jr.
Walter H. Chamberlin
his Atty.

No. 893,954. PATENTED JULY 21, 1908.
I. VAN HUFFEL, Jr.
INDICATING SECTOR FOR DIVIDING HEADS.
APPLICATION FILED OCT. 28, 1907.
2 SHEETS—SHEET 2.
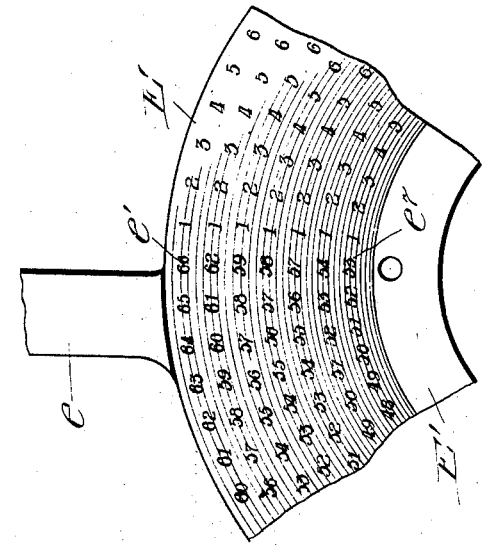
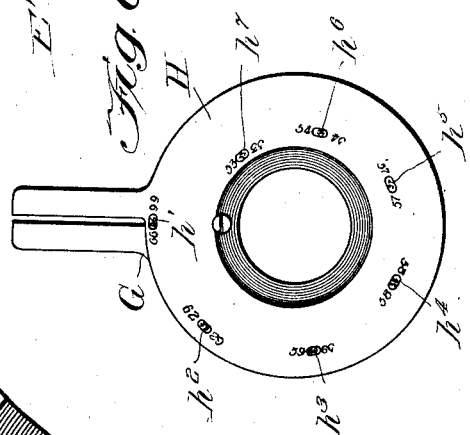
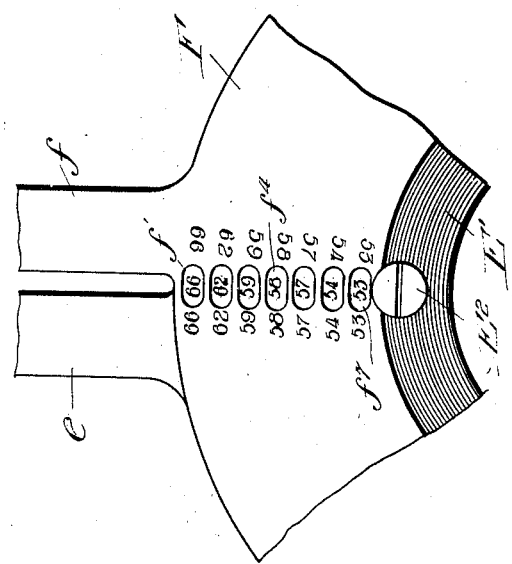
Witnesses:
Harry I. Gaither
Ruby V. Nash
Inventor:
Isadore Van Huffel, Jr.
by Walter H. Chamberlin
his attorney

UNITED STATES PATENT OFFICE.

ISADORE VAN HUFFEL, JR., OF MISHAWAKA, INDIANA.

INDICATING-SECTOR FOR DIVIDING-HEADS.

No. 893,954.     Specification of Letters Patent.     Patented July 21, 1908.

Application filed October 28, 1907. Serial No. 399,421.

*To all whom it may concern:*

Be it known that I, ISADORE VAN HUFFEL, Jr., a citizen of the United States, residing at Mishawaka, county of St. Joseph, State of Indiana, have invented a certain new and useful Improvement in Indicating-Sectors for Dividing-Heads, and declare the following to be a full, clear, and exact description of the same, such as will enable others skilled in the art to which it pertains to make and use the same, reference being had to the accompanying drawings, which form a part of this specification.

Dividing heads, such as are commonly used on milling machines, gear cutters and the like in order to accurately position the work, are usually provided with adjustable sectors for marking various angular sub-divisions upon the head beginning at any desired point thereon. The heads are usually provided with a plurality of series of small holes arranged in concentric circles, the holes in each circle being spaced at equal distances apart and the spacing between the holes in each series being different. In order to give the dividing head a wide range it is necessary to provide a comparatively large number of these circular series of holes and the circles are therefore placed as closely together as is practicable. The sector usually consists of a pair of arms revolubly connected together so as to be movable independently of each other about the center of the dividing head and the adjustment of the sector is effected by placing one of the arms in proximity to one of the holes in the head, then counting the desired number of consecutive holes in the same series as the first hole and bringing the other arm into proximity to the last of the holes thus counted. The two arms of the sector are then clamped together and the sector as a whole may be rotated into any desired position upon the dividing head. The multiplicity of holes in the dividing head is very confusing to the average intelligent workman, and, particularly when attempting to count a considerable number of holes in an intermediate series, there is great danger of accidentally passing from one circle to an adjacent circle, thereby producing a wrong adjustment of the sector. The danger of mistakes is so great that a workman always counts the holes at least twice, before locking the arms of the sector together, in order to insure a proper measurement. Not only must the holes be counted several times in order to insure correctness, but the counting process is of itself slow and tedious.

The object of the present invention is to provide a novel sector for use in connection with dividing heads, whereby adjustment of the sector may be quickly and conveniently made without necessity of counting holes or divisions on the dividing head.

A further object of the present invention is to provide a novel adjustable sector for use in connection with dividing heads, wherein the range of the sector is clearly indicated so that a workman can at all times apprise himself of the adjustment of the sector by simply glancing at the indicator.

Figure 2:
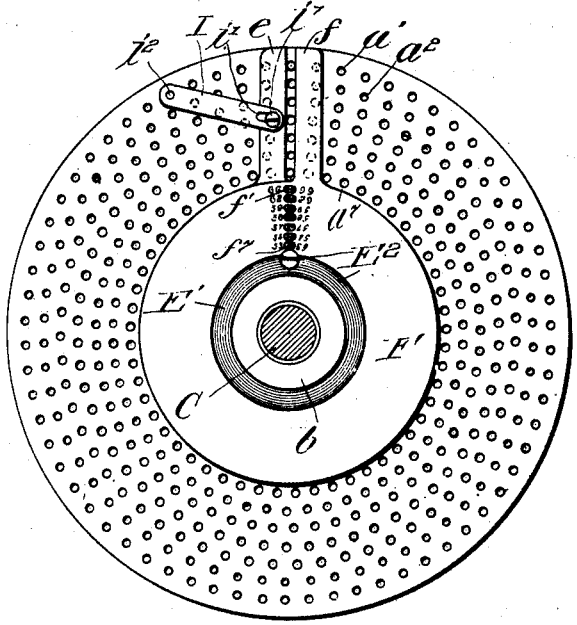
Figure 3:
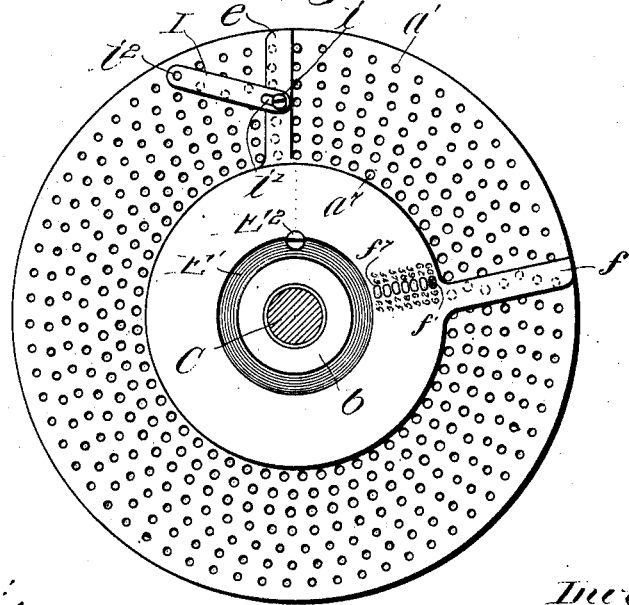

The various features of novelty which characterize my invention will be hereinafter pointed out with particularity in the claims, but for a full understanding of my invention, and of its various objects and advantages, reference may be had to the following detailed description taken in connection with the accompanying drawing, wherein:

Figure 1 is a central cross section through the dividing head of a machine having thereon a sector arranged in accordance with the present invention; Fig. 2 is a section taken on line 2—2 of Fig. 1 looking in the direction of the arrows; Fig. 3 is a view similar to Fig. 2 showing, however, a different adjustment of the sector; Fig. 4 is a fragmentary view on an enlarged scale of a portion of the sector; Fig. 5 is a view similar to Fig. 4 with one of the sections of the sector removed; and Fig. 6 is a front view of a modified form of sector.

In the drawings I have illustrated my invention as applied to a dividing head for a milling machine and in the description I shall refer particularly to this form of my invention; but it will, of course, be understood that the invention is not limited in its application to milling machines or to any particular form of dividing head.

Referring to the drawings, A indicates a dividing head secured in any usual manner to a fixed portion B of the machine to which the head is applied.

C is a shaft extending through the center of the head and carrying upon its outer end an arm D whereby the shaft may be rotated.

The head is provided in its face with a number of series of holes arranged in the form of circles $a'$ to $a^7$ inclusive. Although 7 of these circles are shown it will, of course, be understood that the present invention is not confined to any particular number of such circles. The outermost circle contains sixty six holes, the innermost fifty three holes, and the remaining circles contain intermediate numbers of holes. The holes in each circle are equally spaced so that the outermost circle divides the head into sixty six parts, while the innermost circle divides the head into fifty three parts.

The shaft C controls the position of the work and the position of the work is changed by rotating the shaft through the handle D. The handle is provided with a pin $d$ which is of such diameter as to be capable of entering any one of the holes in the dividing head. It will be seen that when the pin is located in any one of the holes the shaft is locked against rotation and the work is accordingly held rigidly in its adjusted position. In order that the pin may be carried radially of the head so as to register with the holes in any of the circles, the handle is provided with an elongated slot $d'$ which permits it to be radially adjusted upon the end of the shaft.

All of the above parts are of old and well known construction and no detailed description is therefore deemed necessary.

It is necessary to provide some means for conveniently measuring the arc through which the handle is to travel whenever it is desired to move the handle successively through a number of equal arcs of less than 360 degrees or an even multiple of 360 degrees, in order to save the workmen the trouble of counting a certain number of holes in one of the circles whenever the handle is shifted. To this end I have devised a novel form of adjustable sector which may be quickly and conveniently adjusted to mark off any of the angles which is measured by any number of holes in any of the circles, without danger of error. The particular form of sector illustrated consists of two disks E and F each of which has a diameter slightly smaller than the diameter of the innermost circle of holes on the dividing head. These disks are revolubly mounted concentrically with the head in any suitable manner, as for example, the disk E surrounds the end of the hub $b$ which carries the head; and the disk F may be mounted upon a hub $E'$ on the disk E. $E^2$ is a screw carried by the hub $E'$ in such position that its head may overlap the inner edge of the disk F. When the screw is loosened the two disks may be revolved independent of each other and when the screw is tightened the two disks are locked together. The sector as a whole may be held in place against the face of the dividing head in any suitable manner, as for example by means of a collar $c$ arranged upon the shaft C between the disk F and the handle D. E is provided with a radially extending arm $e$ while the disk F has a similar arm $f$; these arms being of such length as to extend across the several circles of holes.

The disk E is provided with a plurality of series of numbers arranged in the form of concentric circles, $e'$ to $e^7$, there being as many of these circles as there are circles on the dividing head. There are as many numbers in each circle as there are holes in the corresponding circle of the dividing head, and the numbers in each case are run consecutively beginning with unity. It will thus be seen that the disk E is a reproduction of the dividing head on a smaller scale, except that instead of the holes in the dividing head the disk is marked with the numbers corresponding to the holes. The second disk of the sector covers the numbers but is provided with a series of windows $f'$ to $f^7$ so located that when the two arms $e$ and $f$ are brought together, namely so as to engage with the pin $d$ on opposite sides thereof, the final number of each series is visible through one of the windows. Each of the windows is marked with a designating character so as to associate it with one of the circles on the head, thus the window $f'$ has arranged on opposite sides thereof the number sixty six, indicating that this window is to be used in connection with circle having sixty six holes: namely the circle $a'$. In the same way the window $f^7$ has marked on opposite sides thereof the number 53, indicating that this window is to be used in connection with the innermost circle $a^7$ of the dividing head. It will be seen that the final number of each series is also the zero point of the series.

When it is desired to adjust the sector so as to mark off any desired angle on the head, beginning with the hole in which the pin $d$ happens to be located, the two arms $e$ and $f$ are brought toward each other until they engage with the pin; and the arm $f$ is then moved away from the pin until the proper number appears through one of the windows. The screw $E^2$ may now be tightened and the sector moved as a whole to properly position the handle at various points around the dividing head. Thus, for example, if it is desired to move the handle a number of times through an angle corresponding to fourteen holes in the outermost circle or through one or more revolutions in addition to this number of holes, the sector is adjusted until the numeral fourteen shows through the window marked 66. In the same way if the measurement is to be made from any other circle, the adjustment of the sector is effected by producing a relative movement between the parts thereof until the number corresponding to the desired number of holes shows through the window corresponding to the circle of holes from which the measurement is to be determined. It will thus be seen that the confusion which ordinarily results from an effort to count a predetermined number of holes in any circle on the dividing head is entirely avoided, since it is only necessary for the workman to bring the sector to the zero position and then to move the arms thereof apart until the desired number appears under the window which is marked with the same number as the number of holes in the circle which is being used to give the desired angle.

In Figs. 1 to 5 I have shown the final numbers of the series arranged along a radial line; the windows are therefore also arranged in a radial line. It is, of course, unnecessary that this particular arrangement be employed, and in fact, it may in some instances be preferable to have the final numbers, namely the zero points, arranged in staggered relation; the windows being therefore also arranged in staggered relation so that all of the final numbers will show simultaneously through their windows. In such an arrangement each window may be isolated from the others so that all chance of confusion is avoided. When the windows are arranged in staggered relation it is possible to place the circles of numbers closer together than is the case where the windows are all arranged in single radial line; this being of advantage where it is desired to give to the sector as wide a range as possible.

In Fig. 6 I have shown a front view of the sector which is similar in all respects to the sector shown in the other figures, except that the numbers are so arranged that the windows are distributed around the outer disk. The two members of the sector are indicated by the reference characters G and H respectively, and the windows by the characters $h'$ to $h^7$.

It sometimes happens that after a sector has been adjusted and moved into the desired position upon the dividing head, a slippage occurs, so that the accuracy of the measurement is defeated. In order to prevent such slippage I have provided a locking dog I which is connected to the arm $e$ of the sector by means of an adjustable screw $i$ which passes through an elongated slot $i'$ in the member I. The free end of the member I is provided with a pin $i^2$ which is adapted to drop into one of the holes in the dividing head. After the sector has been brought to the desired position the screw $i$ is loosened and the locking dog may then be adjusted so as to bring the pin $i^2$ into one of the holes. When the screw is again tightened the sector is locked against displacement.

Having now fully described my invention, what I claim as new and desire to secure by Letters Patent is:

1. The combination with a calibrated dividing head having thereon a plurality of series of divisions arranged in the form of concentric circles, of an adjustable sector for marking angles on said head, said sector being provided with means for indicating the angle marked thereby in terms of exact multiples of the divisions contained in any of the aforesaid circles.

2. The combination with a dividing head having marked thereon a series of groups of angles, the sum of the angles of each group being equal to 360 degrees and the angles in each group being different from those in the other groups, of an adjustable sector for marking off any desired number of said angles at any desired point upon the head, said sector being provided with means for indicating the angle marked thereby in terms of exact multiples of the angles in any group.

3. The combination with a dividing head having thereon a plurality of groups of divisions, the divisions of each group being arranged in the form of a circle concentric with the other circles and the spacing of the divisions in each group being different from the spacing of the divisions in the other groups, of an adjustable sector for marking off any desired portion of said head beginning at any desired division, said sector having thereon a series of groups of consecutive numbers each beginning with unity and equaling in number the number of divisions in one of the aforesaid groups of divisions, together with an index coöperating with said numbers so as to designate the number corresponding to the number of divisions of any group contained in the portion marked off by the sector.

4. The combination with a dividing head having a series of equally-spaced divisions thereon arranged in a circle; of a pair of radial arms pivotally connected so as to be capable of oscillation about the center of said circle, said arms being provided with concentric disks lying one upon the other, one of said disks having thereon a series of equally-spaced consecutive numbers beginning with unity and equaling numerically the divisions on said head, said numbers being arranged in a circle concentric with said divisions, and the other of said disks having an opening therein through which any one of said numbers may be made visible by moving the arms from or toward each other.

5. In combination, a dividing head having thereon a series of equally-spaced divisions arranged in the form of a circle, a pair of relatively-movable revoluble superposed disks, one of said disks having thereon a series of equally-spaced numbers beginning with unity and equaling numerically the divisions on said head, said numbers being arranged in a circle concentric with the aforesaid circle, the other disk having a window through which any one of said numbers may be made visible, and a radially-projecting arm on each of said disks arranged to traverse the divisions on said head, said arms being so placed that when they are closest to each other the extreme number of the series shows through said window.

6. In combination, a dividing head having thereon a plurality of series of divisions arranged in the form of concentric circles; a disk revolubly mounted adjacent said head and having thereon a plurality of series of consecutive numbers arranged in the form of circles concentric with the aforesaid circles, each of said series of numbers beginning with unity and equaling numerically the divisions of one of the series of divisions on the head; a second disk superposed upon the first disk and revoluble relatively thereto about the center of said circles, said second disk being arranged to cover the numbers on the first disk and having windows therein through each of which one of the numbers of a series may be exposed; said disks each having a radial arm and the arrangement being such that when said arms are brought into proximity to each other the final number of each series is exposed through one of the windows.

7. The combination with a dividing head having thereon a plurality of series of divisions arranged in the form of concentric circles, a disk revolubly mounted adjacent said head and having thereon a plurality of series of consecutive numbers arranged in the form of circles concentric with the aforesaid circles each of said series of numbers beginning with unity and equaling numerically the divisions of one of the series of divisions on the head; an arm extending radially from said disk across said head; a second radial arm pivoted so as to be rotatable about the center of said disk, and indexes on said second arm arranged to coöperate with said circles of numbers.

In testimony whereof, I, sign this specification in the presence of two witnesses.

ISADORE VAN HUFFEL, Jr.

Witnesses:
J. F. McMillan,
Bertha Friedman.